(12) United States Patent
Devenyl

(10) Patent No.: US 7,270,022 B2
(45) Date of Patent: Sep. 18, 2007

(54) TEMPERATURE-COMPENSATED STRUCTURE WITH FORCE MULTIPLIER FOR THE TEMPERATURE COMPENSATOR

(75) Inventor: Gabor Devenyl, Penetang (CA)

(73) Assignee: Raytheon Company, Waltham, MA (US)

( * ) Notice: Subject to any disclaimer, the term of this patent is extended or adjusted under 35 U.S.C. 154(b) by 103 days.

(21) Appl. No.: 11/207,924

(22) Filed: Aug. 19, 2005

(65) Prior Publication Data

US 2007/0039393 A1    Feb. 22, 2007

(51) Int. Cl.
*G02B 7/02*    (2006.01)
*G01D 7/02*    (2006.01)

(52) U.S. Cl. ...................... 73/866.1; 359/820
(58) Field of Classification Search .................. 73/765, 73/766, 866.1; 359/820
See application file for complete search history.

(56) References Cited

U.S. PATENT DOCUMENTS

| | | | |
|---|---|---|---|
| 3,053,281 A * | 9/1962 | Taylor ............................ 92/1 |
| 4,010,365 A | 3/1977 | Meyers et al. | |
| 4,240,298 A | 12/1980 | Wetterhorn | |
| 4,364,271 A * | 12/1982 | Froome ..................... 73/866.1 |
| 4,466,278 A * | 8/1984 | Remus ......................... 73/115 |
| 4,538,458 A | 9/1985 | Bruce et al. | |
| 4,671,624 A | 6/1987 | Kahan | |
| 5,219,051 A | 6/1993 | Davis | |
| 5,305,981 A | 4/1994 | Cunningham et al. | |
| 5,396,325 A | 3/1995 | Carome et al. | |
| 5,865,472 A | 2/1999 | Freynhofer | |
| 6,523,802 B1 | 2/2003 | Earle | |
| 6,631,040 B1 * | 10/2003 | Cox ........................... 359/820 |
| 2004/0182166 A1 | 9/2004 | Jones et al. | |
| 2004/0237648 A1 | 12/2004 | Jones et al. | |

* cited by examiner

*Primary Examiner*—Edward Lefkowitz
*Assistant Examiner*—Punam Patel
(74) *Attorney, Agent, or Firm*—Leonard A. Alkov; H. Saint St. Julian; John J. Horn

(57) ABSTRACT

A temperature-compensated structure includes a temperature compensator having a temperature-compensation bellows whose length is responsive to changes in temperature, and a temperature-compensation actuator that moves responsive to the length of the temperature-compensation bellows. There is a movable structure, and a mechanical force multiplier extending between the temperature-compensation actuator and the movable structure so that a force applied to the movable structure is greater than the force produced by the temperature-compensation bellows.

32 Claims, 1 Drawing Sheet

TEMPERATURE-COMPENSATED STRUCTURE WITH FORCE MULTIPLIER FOR THE TEMPERATURE COMPENSATOR

This invention relates to a structure wherein a position of at least a part of the structure is movable to compensate for temperature changes and, more particularly, to such a structure having a force multiplier to increase the force produced by the temperature compensator.

BACKGROUND OF THE INVENTION

One form of an infrared optical system includes several lenses made of infrared-transparent lens materials such as germanium or silicon. The lenses are arranged at the proper positions along an optical path to achieve the desired effects. However, the refractive index and other optical properties of such infrared lens materials are strongly dependent upon temperature. If the temperature changes so that the optical properties of the lens materials change, the lenses may no longer be properly positioned relative to each other, and the performance of the infrared optical system is degraded.

One approach to reducing the adverse effects of the temperature dependence of the lens properties is to mount one or more of the lenses in a temperature compensator. The axial position of the mounted lens along the optical path is altered by the temperature compensator as the temperature changes, so as to null the effects of the changes in the optical properties of the lens material. In some applications, it is sufficient to mount only the lens having the greatest temperature dependence of its optical properties on the temperature compensator.

This approach works well in applications involving only static forces applied to move the lens mounted on the temperature compensator. However, where the system is subject to vibrations or sudden accelerations, the inventor has observed, in the work leading to the present invention, that the temperature compensator is prone to premature mechanical failure, which in turn leads to a degradation in the properties of the optical system because it can no longer compensate for the changes in the optical properties of the lenses.

There is a need for an improved approach to temperature-compensated optical systems to overcome the sensitivity to vibrations and accelerations. The present invention fulfills this need, and further provides related advantages.

SUMMARY OF THE INVENTION

The present invention provides a temperature-compensated structure which is much less sensitive to vibrations, accelerations, and mechanical shocks than prior comparable temperature-compensated structures. The present approach is highly versatile, and may be applied to a range of optical systems as well as other applications.

In accordance with the invention, a temperature-compensated structure comprises a temperature compensator having a temperature-compensation bellows whose length is responsive to changes in temperature, and a temperature-compensation actuator that moves responsive to the length of the temperature-compensation bellows. The temperature-compensation bellows may be a liquid-filled bellows. The temperature-compensated structure further includes a movable structure, and a mechanical force multiplier extending between the temperature-compensation actuator and the movable structure. A force applied to the movable structure is greater than the force produced by the temperature-compensation bellows, due to the force multiplier. There is no rigid connection between the temperature-compensation actuator and the movable structure.

In one embodiment, the movable structure comprises a slider, a temperature-compensated element mounted to the slider, and a bias engaged to the temperature-compensated element. The temperature-compensated element may include a lens, such as an infrared lens. There may also be at least one additional lens that is not acted upon by the temperature compensator.

In one form, the force multiplier comprises a first inclined ramp on the temperature-compensation actuator, a second inclined ramp on the movable structure, and a connecting element, such as a rolling or sliding element, contacting the first inclined ramp and the second inclined ramp. A movement of the temperature-compensation actuator produces a movement of the movable structure.

More specifically in a preferred embodiment, a temperature-compensated structure comprises a temperature compensator, itself comprising a temperature-compensation bellows having a fixed end and a movable end including a temperature-compensation actuator which moves responsive to changes in temperature. A movable structure comprises a slider, a temperature-compensated lens element mounted to the slider, and a bias engaged to the temperature-compensated lens element and positioned to resist movement of the temperature-compensated lens element. A force multiplier extends between the temperature-compensation actuator and the movable structure. A force applied to the movable structure is greater than the force produced by the temperature-compensation bellows. The force multiplier preferably comprises a first inclined ramp on the temperature-compensation actuator, a second inclined ramp on the movable structure, and a rolling element contacting the first inclined ramp and the second inclined ramp, so that a movement of the temperature-compensation actuator produces a movement of the movable structure. Other compatible features discussed herein may be used with this embodiment.

In a absence of the present force-multiplier approach, forces created by the mass of the movable structure would be transmitted back to the temperature compensator through a rigid connection. Vibrations or accelerations of the movable structure would cause large loads to be applied to the temperature compensator. These large loads and possibly repetitive loads could cause the bellows to crack and become ineffective. In the present approach, on the other hand, the force multiplier increases the forces applied from the temperature compensator to the movable structure, but decreases the undesirable vibrational or accelerational forces applied from the movable structure back to the temperature compensator. The result is that the vibrational or accelerational forces applied to the bellows are reduced from they would otherwise be, reducing the likelihood of premature failure of the bellows.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
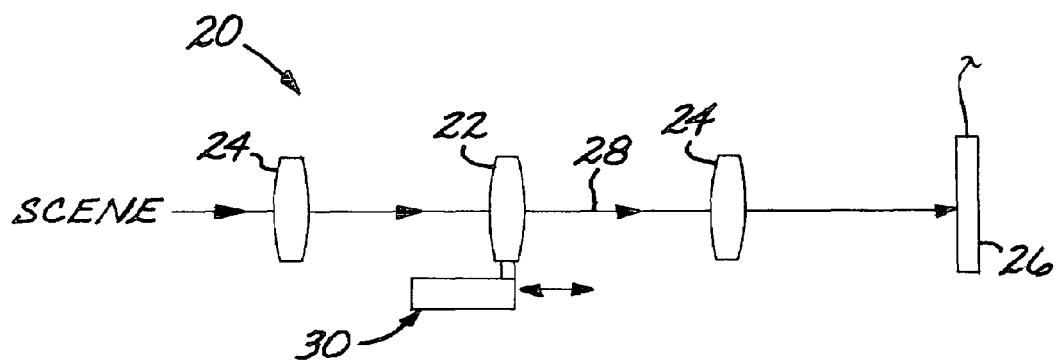
FIG. 1 is a schematic view of a temperature-compensated structure.

FIG. 1 depicts an embodiment of a temperature-compensated structure 20. The temperature-compensated structure 20 in this case is an optical system, and specifically an infrared optical system. The temperature-compensated structure 20 includes a temperature-compensated lens, here a temperature-compensated infrared lens 22. The infrared lens 22 is made of a material that is transparent to infrared light in a wavelength range of interest. Such materials are known in the art. In this example there are two other infrared lenses 24 that are not temperature compensated, and an infrared detector 26. The elements 22, 24, and 26 lie on an optical path 28. Light from a scene travels on the optical path 28 from the scene, passes through the lenses 22 and 24, and is incident upon the detector 26.

Figure 2:
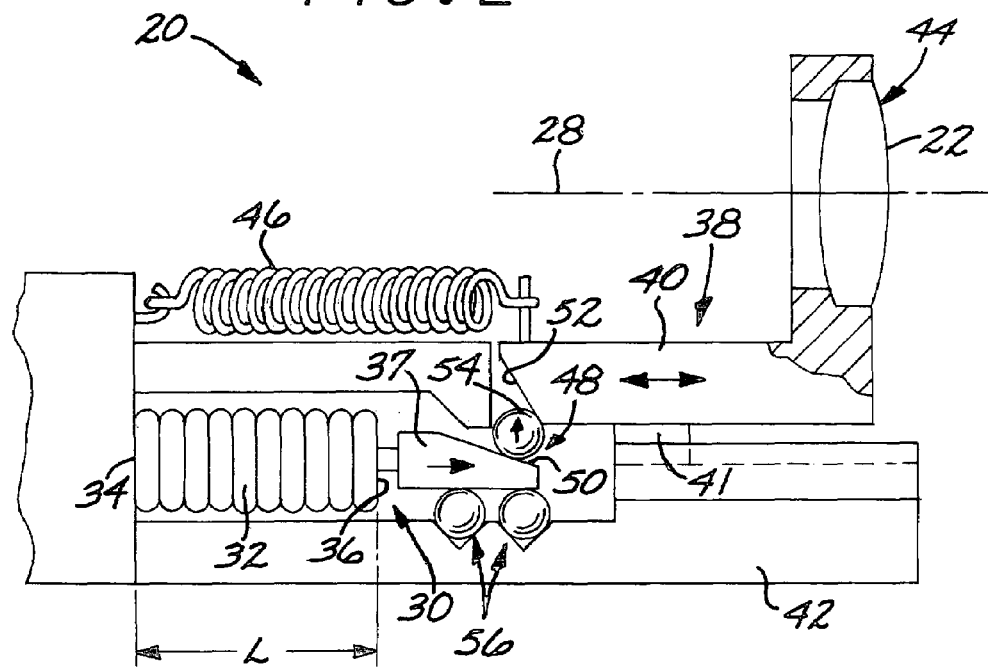
FIG. 2 is a schematic detail view of a portion of the temperature-compensated structure of FIG. 1.

FIG. 2 illustrates a detail of the temperature-compensated structure 20, the temperature-compensated infrared lens 22 and its associated temperature-compensating structure. This portion of the temperature-compensated structure 20 includes a temperature compensator 30 having a temperature-compensation bellows 32 whose length L changes responsive to changes in temperature. An interior of the temperature-compensation bellows 32 is preferably filled with a liquid such as DC 200 silicone-based fluid, available from Dow Corning, that expands and contracts as the temperature increases and decreases. The temperature-compensated bellows 32 may instead be filled with another liquid or with a gas such as air. In the illustrated embodiment, a first end 34 of the temperature-compensation bellows 32 is stationary, and a second end 36 is free to move parallel to the direction in which the length L is measured (and parallel to the optical path 28) as the bellows 32 expands and contracts when the temperature increases and decreases. This is a passive temperature compensator 30, which does not utilize any active sensor or control device. However, an active temperature compensator may be used instead.

A temperature-compensation actuator 37 is affixed to the second end 36 of the temperature-compensation bellows 32. The temperature-compensation actuator 37 moves responsive to the length L of the temperature-compensation bellows 32, which in turn moves responsive to the temperature.

There is a movable structure 38. The illustrated preferred movable structure 38 includes a slider 40 that is mounted to a support arm 42 (which is itself stationary and not movable) by a sliding element 41 so that the slider 40 may move parallel to the direction of expansion and contraction of the temperature-compensation bellows 32 (and thence parallel to the optical path 28) with relatively low friction. The sliding element 41 may accomplish the low-friction movement by any operable approach, such as, for example, the use of rollers, balls, air bearings, magnetic bearings, lubricated slide, or the like. A temperature-compensated element 44, in this case the temperature-compensated infrared lens 22, is mounted to the slider 40. A bias 46, illustrated as a coil spring, is engaged to the temperature-compensated element 44, and in this case to the slider 40 upon which the temperature-compensated element 44 is mounted, to mechanically bias the temperature-compensated element 44 in one direction parallel to the direction of expansion and contraction of the temperature-compensation bellows 32, i.e., parallel to the optical path 28.

A mechanical force multiplier 48 extends between the temperature-compensation actuator 37 and the movable structure 38. A force applied to the movable structure 38 is therefore greater than the force produced by the temperature-compensation bellows 32 as it expands and contracts. The force multiplier 48 may be of any operable type that does not include a rigid connection between the temperature-compensation actuator 37 and the movable structure 38. In the preferred and illustrated embodiment, the force multiplier 48 comprises a first inclined ramp 50 on the temperature-compensation actuator 37, a second inclined ramp 52 on the slider 40 of the movable structure 38, and a connecting element 54 contacting the first inclined ramp 50 and contacting the second inclined ramp 52. The connecting element 54 is preferably a roller or a ball, as illustrated. A movement of the temperature-compensation actuator 37, responsive to the movement of the temperature-compensation bellows 32, produces a movement of the movable structure 38, but with an increased force applied to the slider 40 due to the relative angles selected for the inclined ramps 50 and 52. The magnitude of the force multiplication may be controlled by the relative angles of the inclined ramps 50 and 52. Conversely, any force produced in the slider 40, such as a vibrational or accelerational force, is reduced in magnitude when it is transmitted through the mechanical force multiplier 48 (acting as a mechanical force reducer in the reverse direction) to the temperature-compensation bellows 32. The force multiplier 48 thus functions to mechanically unload the temperature-compensation bellows 32 in respect to any such vibrational or accelerational forces.

There is no rigid connection between the temperature-compensation actuator 37 and the slider 40 of the movable structure 38. Accordingly, there is no force-transmitting path to transmit large vibrational or accelerational forces from the movable structure 38 into the temperature-compensation bellows 32. All such vibrational or accelerational (or other) loads transmitted from the movable structure 38 to the temperature-compensation bellows 32 pass through the force multiplier 48, which serves as a force de-multiplier for forces transmitted in the direction from the movable structure 38 to the temperature-compensation bellows 32. These forces are therefore reduced in magnitude, with the result that the force-compensation bellows 32 is subjected to reduced forces and is less likely to prematurely fail during service.

The bias 46 serves to keep the force multiplier 48 in an integral form with its components forced tightly together. The bias 46 also prevents backlash when the direction of movement of the temperature-compensation actuator 37 changes.

A guide bearing 56 is provided between the temperature-compensation actuator 37 and the stationary support arm 42. The guide bearing 56 constrains the temperature-compensation actuator 37 to move parallel to the support arm 42 and thence parallel to the optical path 28, and also aids in retaining the integral structure of the force multiplier 48. The guide bearing 56 may be of any operable form, but is illustrated as a ball bearing structure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A temperature-compensated structure, comprising:
a temperature compensator having a temperature-compensation bellows whose length is responsive to changes in temperature, and a temperature-compensation actuator that moves responsive to the length of the temperature-compensation bellows;

a movable structure, wherein the movable structure comprises a slider, a temperature-compensated element mounted to the slider, wherein the temperature-compensated element includes a lens, and a bias engaged to the temperature-compensated element; and a mechanical force multiplier extending between the temperature-compensation actuator and the movable structure, wherein a force applied to the movable structure is greater than the force produced by the temperature-compensation bellows, and wherein there is no rigid connection between the temperature-compensation actuator and the movable structure.

2. The temperature-compensated structure of claim 1, wherein the temperature-compensation bellows is filled with a liquid.

3. The temperature-compensated structure of claim 1, wherein the force multiplier comprises a first inclined ramp on the temperature-compensation actuator, a second inclined ramp on the movable structure, and a rolling element contacting the first inclined ramp and the second inclined ramp, so that a movement of the temperature-compensation actuator produces a movement of the movable structure.

4. The temperature-compensated structure of claim 1, wherein the movable structure comprises a slider, a temperature-compensated element mounted to the slider, and a bias engaged to the temperature-compensated element.

5. The temperature-compensated structure of claim 1, further including at least one lens that is not acted upon by the temperature compensator.

6. The temperature-compensated structure of claim 1, wherein the movable structure comprises a slider, a temperature-compensated element mounted to the slider, wherein the temperature-compensated element includes an infrared lens, and a bias engaged to the temperature-compensated element.

7. The temperature-compensated structure of claim 1, wherein the temperature-compensation actuator is affixed to a movable end of the temperature-compensation bellows.

8. A temperature-compensated structure, comprising:

a temperature compensator comprising a temperature-compensation bellows having a fixed end and a movable end including a temperature-compensation actuator which moves responsive to changes in temperature;

a movable structure comprising a slider, a temperature-compensated lens element mounted to the slider, and a bias engaged to the temperature-compensated lens element and positioned to resist movement of the temperature-compensated lens element; and a force multiplier extending between the temperature-compensation actuator and the movable structure, wherein a force applied to the movable structure is greater than the force produced by the temperature-compensation bellows, and wherein the force multiplier comprises a first inclined ramp on the temperature-compensation actuator, a second inclined ramp on the movable structure, and a connecting element contacting the first inclined ramp and the second inclined ramp, so that a movement of the temperature-compensation actuator produces a movement of the movable structure.

9. The temperature-compensated structure of claim 8, wherein the temperature-compensation bellows is filled with a liquid.

10. The temperature-compensated structure of claim 8, further including at least one lens that is not acted upon by the temperature compensator.

11. The temperature-compensated structure of claim 8, wherein the temperature-compensated element includes an infrared lens, and a bias engaged to the temperature-compensated element.

12. The temperature-compensated structure of claim 8, wherein the connecting element is a roller or a ball.

13. A temperature-compensated structure, comprising:

a temperature compensator having a liquid filled temperature-compensation bellows whose length is responsive to changes in temperature, and a temperature-compensation actuator that moves responsive to the length of the temperature-compensation bellows;

a movable structure; and a mechanical force multiplier extending between the temperature-compensation actuator and the movable structure, wherein a force applied to the movable structure is greater than the force produced by the temperature-compensation bellows, and wherein there is no rigid connection between the temperature-compensation actuator and the movable structure.

14. The temperature-compensated structure of claim 13 wherein the force multiplier comprises a first inclined ramp on the temperature-compensation actuator, a second inclined ramp on the movable structure, and a rolling element contacting the first inclined ramp and the second inclined ramp, so that a movement of the temperature-compensation actuator produces a movement of the movable structure.

15. The temperature-compensated structure of claim 13 wherein the movable structure comprises a slider, a temperature-compensated element mounted to the slider, and a bias engaged to the temperature-compensated element.

16. The temperature-compensated structure of claim 13 wherein the movable structure comprises a slider, a temperature-compensated element mounted to the slider, wherein the temperature-compensated element includes a lens, and a bias engaged to the temperature-compensated element.

17. The temperature-compensated structure of claim 16, further including at least one lens that is not acted upon by the temperature compensator.

18. The temperature-compensated structure of claim 13 wherein the movable structure comprises a slider, a temperature-compensated element mounted to the slider, wherein the temperature-compensated element includes an infrared lens, and a bias engaged to the temperature-compensated element.

19. The temperature-compensated structure of claim 13 wherein the temperature-compensation actuator is affixed to a movable end of the temperature-compensation bellows.

20. A temperature-compensated structure, comprising:
a temperature compensator having
a temperature-compensation bellows whose length is responsive to changes in temperature, and
a temperature-compensation actuator that moves responsive to the length of the temperature-compensation bellows;
a movable structure; and
a mechanical force multiplier extending between the temperature-compensation actuator and the movable structure, wherein a force applied to the movable structure is greater than the force produced by the temperature-compensation bellows, and wherein there is no rigid connection between the temperature-compensation actuator and the movable structure, wherein the force multiplier further comprises:
a first inclined ramp on the temperature-compensation actuator,
a second inclined ramp on the movable structure, and
a rolling element contacting the first inclined ramp and the second inclined ramp, so that a movement of the temperature-compensation actuator produces a movement of the movable structure.

21. The temperature-compensated structure of claim 20, wherein the movable structure comprises
a slider,
a temperature-compensated element mounted to the slider, and
a bias engaged to the temperature-compensated element.

22. The temperature-compensated structure of claim 20 wherein the movable structure comprises
a slider,
a temperature-compensated element mounted to the slider, wherein the temperature-compensated element includes a lens, and
a bias engaged to the temperature-compensated element.

23. The temperature-compensated structure of claim 22 further including at least one lens that is not acted upon by the temperature compensator.

24. The temperature-compensated structure of claim 20, wherein the movable structure comprises
a slider,
a temperature-compensated element mounted to the slider, wherein the temperature-compensated element includes an infrared lens, and
a bias engaged to the temperature-compensated element.

25. The temperature-compensated structure of claim 24 wherein the temperature-compensation actuator is affixed to a movable end of the temperature-compensation bellows.

26. A temperature-compensated structure, comprising:
a temperature compensator having
a temperature-compensation bellows whose length is responsive to changes in temperature, and
a temperature-compensation actuator that moves responsive to the length of the temperature-compensation bellows;
a movable structure, wherein the movable structure comprises
a slider,
a temperature-compensated element mounted to the slider, and
a bias engaged to the temperature-compensated element; and
a mechanical force multiplier extending between the temperature-compensation actuator and the movable structure, wherein a force applied to the movable structure is greater than the force produced by the temperature-compensation bellows, and wherein there is no rigid connection between the temperature-compensation actuator and the movable structure.

27. The temperature-compensated structure of claim 26 wherein the temperature-compensated element includes a lens.

28. The temperature-compensated structure of claim 27 further including at least one lens that is not acted upon by the temperature compensator.

29. The temperature-compensated structure of claim 26 wherein the temperature-compensated element includes an infrared lens.

30. The temperature-compensated structure of claim 26 wherein the temperature-compensation actuator is affixed to a movable end of the temperature-compensation bellows.

31. A temperature-compensated structure, comprising:
a temperature compensator having
a temperature-compensation bellows whose length is responsive to changes in temperature, and
a temperature-compensation actuator that moves responsive to the length of the temperature-compensation bellows;
a movable structure, wherein the movable structure comprises
a slider,
a temperature-compensated element mounted to the slider, wherein the temperature-compensated element includes an infrared lens, and
a bias engaged to the temperature-compensated element; and
a mechanical force multiplier extending between the temperature-compensation actuator and the movable structure, wherein a force applied to the movable structure is greater than the force produced by the temperature-compensation bellows, and wherein there is no rigid connection between the temperature-compensation actuator and the movable structure.

32. The temperature-compensated structure of claim 31 wherein the temperature-compensation actuator is affixed to a movable end of the temperature-compensation bellows.

* * * * *